Nov. 30, 1965   R. J. PURTELL   3,220,654
IRRIGATION PIPE MOVING SYSTEM
Filed April 19, 1960   4 Sheets-Sheet 2
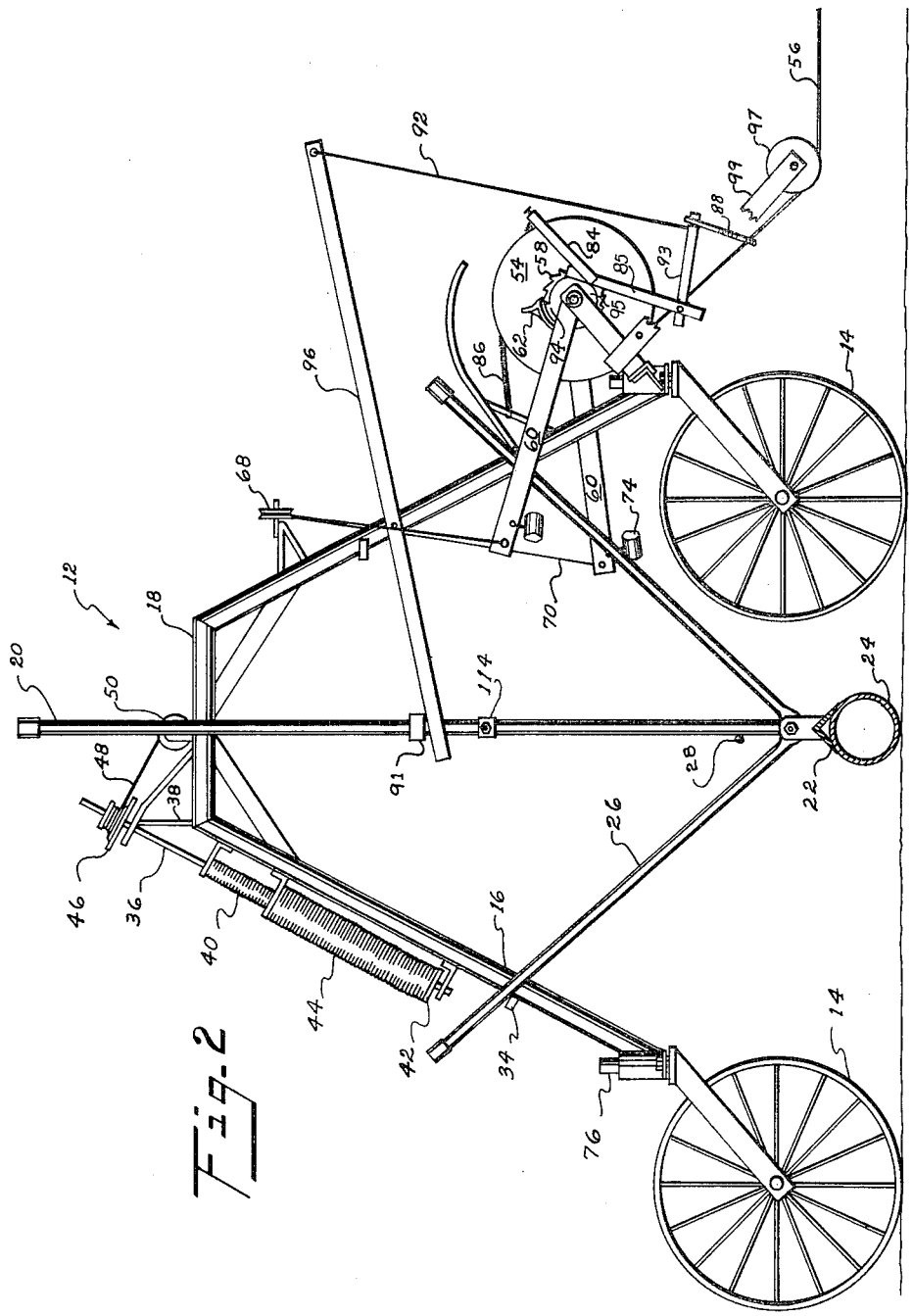
INVENTOR.
Rufus J. Purtell
BY
Atty.

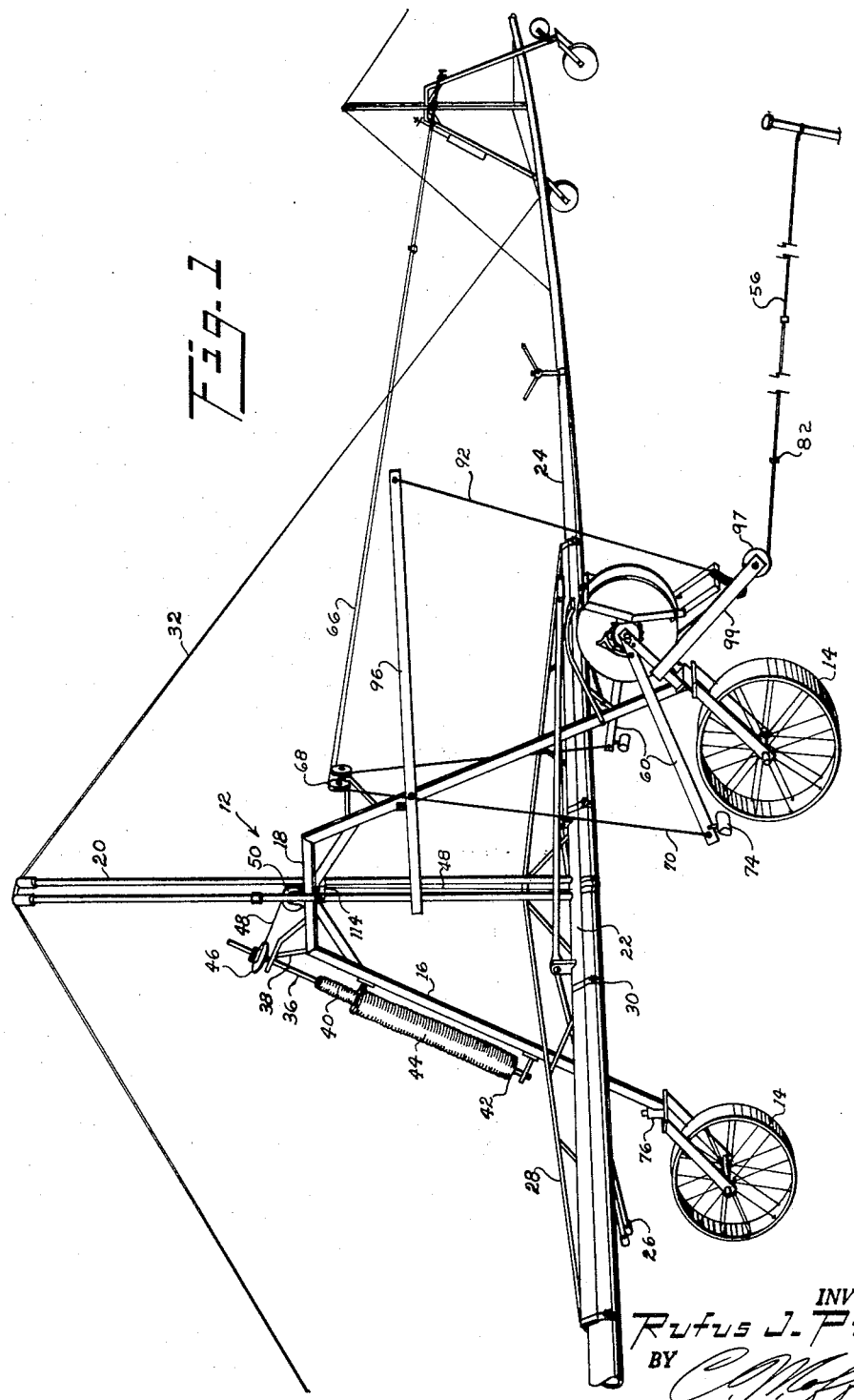

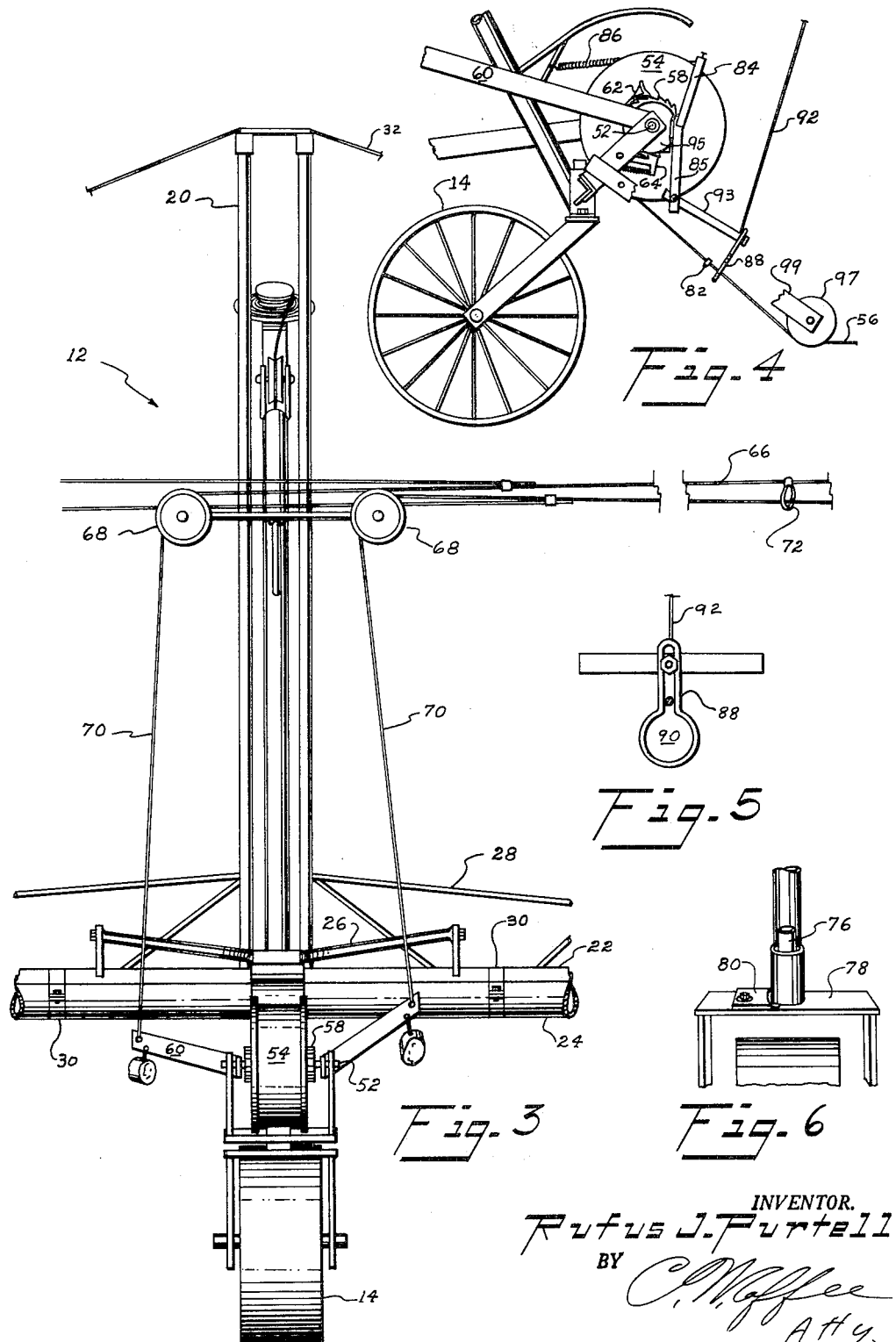

INVENTOR.
Rufus J. Purtell

United States Patent Office 3,220,654
Patented Nov. 30, 1965

3,220,654
IRRIGATION PIPE MOVING SYSTEM
Rufus J. Purtell, Brownfield, Tex., assignor, by mesne assignments, to The J. B. Knight Co. Inc., Brownfield, Tex., a corporation of Texas
Filed Apr. 19, 1960, Ser. No. 26,636
5 Claims. (Cl. 239—212)

This invention pertains to agricultural irrigation and more particularly to a system for moving agricultural pipe.

This invention is an improvement over the system disclosed in my co-pending application entitled Irrigation Pipe Moving System filed on the 11th day of September 1958, Ser. No. 760,469, issued as Patent No. 3,009,646, on November 21, 1961.

An object of this invention is to provide a plurality of vehicles for moving irrigation pipe in a practical manner.

Another object of this invention is to provide an improved means for raising the pipe and supporting it in the raised position between vehicles.

Another object is to provide an improved motive means for the entire series of vehicles.

A further object is to provide an improved means for stopping all the vehicles in line.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing in which:

FIG. 1 is a perspective view of one of the vehicles with a second vehicle shown in the background.

FIG. 2 is a side elevational view of one of the slave vehicles partially broken away.

FIG. 3 is a front view of one of the slave vehicles, not showing the bell crank mechanism.

FIG. 4 is a detail of the drum mechanism.

FIG. 5 is a detail of the bifurcated member.

FIG. 6 is a detail of the wheel caster.

Figures 7, 8:
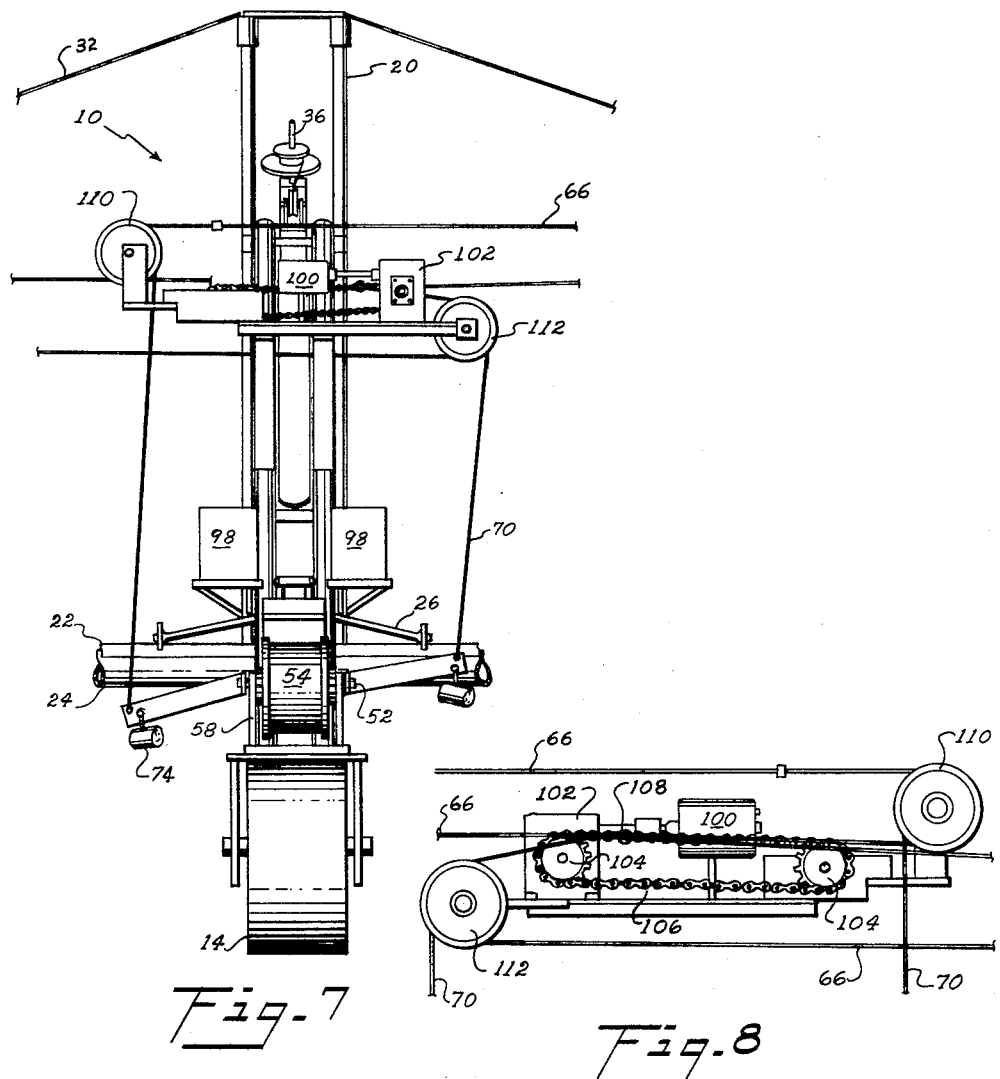
FIG. 7 is a front elevation view of the master vehicle.
FIG. 8 is a partial view of the sprocket mechanism of the master vehicle.
Figure 9:
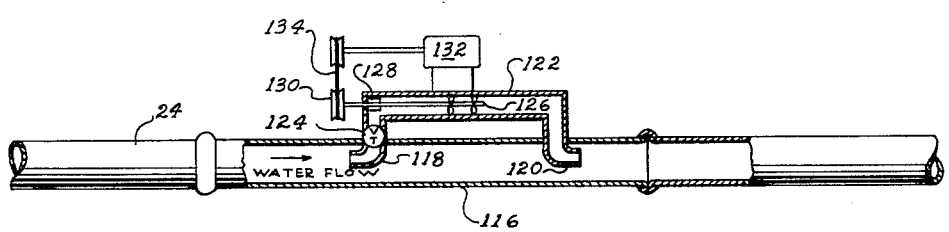
FIG. 9 is a sectional view, partially schematic showing the turbine generator.

As may be seen in the accompanying drawings, a plurality of vehicles are used. Basically for each system there would be one master vehicle 10 and several slave vehicles 12. The master vehicle is identical with the slave vehicles except that it includes a prime mover and a source of energy for the prime mover in addition to the elements contained in the slave vehicles.

*Slave Vehicle*

Each vehicle has two ground engaging wheels 14. These wheels are connected by frame 16, having the general form of an inverted V. The frame is constructed of tubular material suitably braced at angles. Since the construction of light weight welded frames is well known to every village blacksmith, it will not be described in great detail.

The upper part of the frame (the base of the V) has bar 18 thereacross to form a guide. Mast 20 includes two vertical bars which straddle the bar 18. Clamp 22 is rigidly attached to the lower portion of the mast. The clamp 22 is means for attaching it to irrigation pipe 24. Two booms 26 are also attached to the clamp. Each boom has two parallel bars which straddle a leg of the frame. The two bars are pivoted to the clamp, spaced apart longitudinally on the clamp. In this manner the clamp is maintained generally in a position parallel to the axis of wheels 14 in the normal position. As the pipe is attached to the clamp the pipe likewise is maintained in this parallel relationship.

The clamp extends for a considerable length longitudinal of the pipe. Brace 28 at the top of the clamp partially supports the irrigation pipe by the clamp when in the elevated position. The pipe is attached to the clamp by a plurality of bands 30. Guys 32 extend from the top of the mast in either direction to the irrigation pipe. Therefore the guys partially support the irrigation pipe when it is in an elevated position. As the mast moves and is rigidly attached to the pipe, the guys are in the same relationship to the pipe regardless of the amount of elevation. Likewise the mast is retained in a vertical position so that the guys support the pipe regardless of the amount the pipe is elevated off the ground. It will be understood that when the pipe is in the lowest position and resting on the ground, it is supported by the earth and not by the vehicle.

Also it will be understood, like the system of the previous application, that the pipe rests upon the ground when it has water in it and it is elevated only when it is empty of water and therefore light.

The booms 26 are free to slide along the frame. Stops 34 upon the frame prevent the booms from sliding downward. The weight of the booms prevents them from riding up on the frame. It may be seen that the booms will maintain the frame itself normal to the axis of the irrigation pipe.

Axle 36 is attached to the frame along one of the legs. The axle is mounted by brackets 38 having journals therein so that it is free to rotate. Helical torsion spring 40 encircles the axle and is attached securely at the upper end of the spring to the axle. The lower end of the torsion spring 40 is connected to a hub 42 which is mounted on the axle for rotation relative to the axle. The lower end of helical torsion spring 44 is attached securely to the hub, thus mechanically being an extension of spring 40. The upper end of the spring 44 is attached securely to the frame. The axle 36, spring 40 and spring 44 are all co-axial. Drum 46 is attached to the upper portion of the axle. Flexible member or cable 48 is connected to the clamp 22, extends upward through a slot in bar 18, and around sheave 50, and is wound to drum 46. The drum 46 is stepped; at the bottom of the drum, the drum has a greater diameter than at the top of the drum. Therefore when the pipe is all the way down and the springs 40 and 44 wound more tightly, the cable 48 is wound on that portion of the drum 46 with the large diameter. As the clamp reaches the upper portion of its movement and the springs exert less torque, the cable 48 is wound on that portion of the drum 46 with the smaller diameter so that approximately constant tension is maintained upon cable 48. The springs and drum are designed so that when the irrigation pipe 24 is full of water that the weight of the pipe supported by any slave vehicle 12 is greater than the tension of the cable 48. However, if the irrigation pipe is empty (or nearly so) the tension of the cable is greater than the weight of the pipe, mast, booms, clamp and all.

As seen in FIG. 3 the springs 40 and 44 tend to rotate the drum 46 so that it rotates in a counterclockwise direction. Therefore, as the pipe 24 comes up, the springs furnish the power to rotate the drum 46 and the tension on the springs is less. However, when the pipe 24 is full of water and being forced down by the weight of the water, the drum 46 will be rotated in a clockwise direction which will wind the springs 40 and 44, increasing the force and increasing the energy stored in the springs.

Because the pipe is suspended from the clamp and the cable is attached to the clamp the mast will remain at all times in a vertical position.

Shaft 52 (FIGS. 3 and 4) is mounted to the frame so that it is parallel to the irrigation pipe. Drum 54 is mounted for rotation upon the shaft. A cable 56 is wound around the drum and extends from it to a stake set in the ground. Rotation of the drum will wind the cable thus pulling the vehicle forward. Ratchet wheels 58 are on either side of the drum. Levers 60 are mounted on either side of the drum on shaft 52. The levers are mounted for oscillation relative to the drum. Each lever carries a pawl 62 in operative relationship to the ratchet so that oscillation of either lever causes the drum to rotate. Pawl or dog 64 is mounted on the frame next to wheel 58 to prevent back rotation of the drum 54. The ratchet mechanism is means for rotating the drum responsive to oscillation of either lever.

Two cables or lines 66 are mounted for reciprocation relative to the frame. They are caused to reciprocate by mechanism on the master vehicle which will be discussed later. The mounting includes two pulleys or sheaves 68 mounted near the top of the frame so that the lines 66 are at all times above normal growing crops. Each line 66 may be a single cable extending from the master vehicle to the extreme end slave vehicle. At the extreme end slave vehicle as shown in FIGS. 1 and 2, each line extends around a pulley 68 and down to the attachment of the end lever 60. That portion of the line from the pulley 68 to the lever 60 is designated by the numeral 70. On each intermediate slave vehicle a separate line could be attached to main line 66 and then extend around pulley 68 and to the end of the lever 60. An equivalent system shown in the drawings is that the cable from the master vehicle being a part of the line 66 could extend to the first slave vehicle next to the master, extend around the pulley 68 and down to the end of the lever 60. Again that portion of the cable below pulley 68 is designated by the numeral 70. These portions 70 that extend from the line 66 to the end of the lever are hereinafter referred to as "painters." A separate cable is attached to the main line 66 which extends on down to the next vehicle, etc. The two systems are equivalent and both accomplish the same function, in each case there is a flexible line extending from the master vehicle to the end of the lever 60 on each vehicle. The lever has a sliding joint (not shown) therein so that the length of the lever from the point of oscillation about shaft 52 to the point of attachment of painter 70 may be adjusted. As the lines reciprocate the painters also reciprocate, the levers oscillate, the drums rotate, and the vehicle moves forward.

Halfway between the vehicles loop 72 is attached to one line 66 and encircles the other line 66. The lines reciprocate alternately, i.e. one is moving toward the master vehicle therefore pulling up its lever by its painter while the other is moving away from its master vehicle. Therefore one line will be taut while the other is loose. The loop will support the loose line by the taut one. The levers have weights 74 to cause them to fall after they have been lifted by the painter.

At the lower end of each of the legs of the frame there is a vertical journal (FIGS. 2 and 6). Pintle 76 fits within the journal. A plate 78 is attached to the pintle and two legs extend from the plate. An axle at the end of the legs is the axle for the ground engaging wheel 14. In the free condition the arrangement acts as a caster so that the wheels are free to swing about the vertical axis, which does not intersect the axis of rotation of the wheels. The tension of the lines 66 will tend to pull the slave vehicle toward the master vehicle. Tab 80 is attached to the journal. The tab and the plates 78 are parallel and slotted; one with an elongated slot. The plate is bolted into a fixed relationship relative to the journal and the slave vehicle is guided away from the master vehicle. In this way the vehicles are maintained in their correct relationship without depending solely upon the compression of the irrigation pipe.

A series of protuberances 82 are attached to each cable 56. They may be in the form of electrician's clamps or otherwise. Each protuberances is attached by the operator at the point where it is desired for the drum to be after the cable pulls the vehicle forward, e.g. if it is desired to move the pipe about 30 feet between sets, the protuberances on the cables would be 30 feet apart. A set of protuberances on the various cables would be aligned so that the vehicles stop on a line. Bell crank 84 is pivoted to shaft 52. (FIGS. 2 and 4.) The bell crank includes the upper arm to which the numeral 84 points, lower arm 85, and disc 95. The upper arm and lower arm are welded to the disc 95. The disc 95 includes flange 94 (FIG. 2). It is the disc 95 which is journaled upon the shaft 52. Spring 86 biases the upper arm of the bell crank to the frame. The lower arm 85 carries a bifurcated member 88 by pivoted pitman 93. The bifurcated member includes two rods rather close together through which the cable extends. The distance between the rods is less than the width of the protuberance. The lower end of the bifurcated member has enlarged circle 90. The bell crank central disc 95 has an inward turned cylindrical flange 94 which is slightly larger in diameter than the ratchet wheel 58. The flange is co-axial with the ratchet wheel and lays over it. In the normal position the flange is away from the pawl 62. However when the protuberance 82 strikes the bifurcated member 88 it will rotate the bell crank, causing the flange to come between the pawl 62 and the ratchet wheel. Thus further oscillation of the lever is ineffective in rotating the drum. Cord 92 is attached between the upper end of member 88 and lever 96 which in turn is responsive to the position of the mast 20. Lever 96 is pivoted to the frame. The lever 96 is normally in the position with the cord end down as shown in FIG. 1. This is because that portion of the lever is heavier than the other portion. Stop 91 attached to the mast will strike the end of the lever rotating it so that the cord end is up as shown in FIG. 2. As may be seen, the other end of the lever is adjacent to the mast and adapted to be operated by the stop 91 upon the mast. When the mast and irrigation pipe are in the lower position the member 88 is lifted by the cord-lever arrangement, so that the protuberance 82 will go through the circle 90. The spring 86 rotates the bell crank, moving the member 88 to the other side of the protuberance (the circle 90 passing around the protuberance) and flange 94 away from the ratchet. FIG. 2 shows the position of the parts after the bifurcated member 88 has been raised but before the bell crank rotates to move member 88 forward of the protuberance 82 which is hidden from view by the circle 90 of bifurcated member 88. FIG. 4 shows the position of the bell crank after the bifurcated member 88 has passed the protuberance 82 and the flange 94 is moved back away from the operating portion of the pawl 62. Then when the irrigation pipe is raised, the cord drops the member again so that it straddles the cable so that the member is again set to stop the rotation of the drum when the next protuberance is reached upon the cable. The bifurcated member is mounted upon a bolt which is spring biased (not shown) onto the pitman, providing a certain amount of flexibility. The bell crank and pitman extend on both sides of the drum with a flange covering each of the ratchet wheels.

Roller 97 is supported by arm 99 in front of the bifurcated member, by the same structural elements by which the shaft 52 is mounted to the frame. These elements extend on either side of the upright journal carrying the pintle 76. However, they have not been shown in FIG. 6 to simplify that figure. Arm 99 is attached to the frame. Cable 56 is reeved under the roller which is close to the ground, closer than the axle of wheel 14. This direction of stress on cable 56 lightens the load on the front wheel 14.

The speed which the vehicles move (either individually or collectively) can be regulated by the length of the lever arms 60. The longer the lever arm the less rotation movement there will be upon pawl 62 and therefore less rotation of the drum.

*Master vehicle*

As stated above, the master vehicle has all the elements of the slave vehicles and the addition of energy storage means and a prime mover. Because of these additional means it is slightly heavier and therefore has a more sturdy frame. Because of additional weight the ground engaging wheels 14 may be slightly wider.

Energy storage means are provided by a plurality of electrical storage batteries 98 as commonly used in automobiles or trucks. These batteries are connected in parallel electrically to electric motor 100. I have found that motors such as are comomnly used in automotive or truck starter are well adapted to this service. I find that both the batteries and the motors are sufficiently weather proof to be used without additional protection from either the natural elements or the sprinkling water. The motor is mechanically connected to gear box 102. The gear box reduces the speed on a 40 to 1 ratio.

Two sprockets wheels 104 are connected to the frame with their axes parallel. As may be seen one of the sprockets 104 is connected to the output of the gear box 102 which is connected to the frame. Thus, that sprocket 104 is rotated by the rotation of the motor. Sprocket chain 106 connects the wheels. The sprocket chain has a pin 108 by which the two cables or lines 66 are attached. The travel of the chain or a line connecting the axis of the sprocket wheels is parallel to the irrigation pipe. Therefore the cables reciprocate parallel to the pipe which is the direction they extend. One of the cables extends directly to the adjacent slave vehicle. The other cable goes around a sheave 110 so that its movement is opposite the direction of the first cables. Likewise in the opposite direction one cable extends directly to the slave vehicle in that direction and the other cable goes around sheave 112 so that its direction is reversed. Painters 70 are attached to the cables and extend over sheaves 110 and 112 to operate levers 60 of the drums 54 the same as on the slave vehicles.

*Operation*

In operation the first step is to cut off the source of water to the irrigation pipe. Cutting off the source of water will cause the irrigation pipe to drain by valves as is well known to the art and more explicitly explained in my prior patent application identified above. When sufficient water has drained from the pipe the total weight of the pipe is less than the tension upon the flexible member 48 and the flexible member will lift the irrigation pipe together with the mast. If it is not desired that the mast and pipe raise the full extent, stop 114 is attached to the mast to fit against the bar 18. This stop will act to steady and brace the mast in the raised position. It is clamped upon the mast and can be adjusted so that the pipe is lifted the desired amount. The pipe can be clamped in the full lowered position if desired.

With the pipe raised the motor is started. The starting of electrical motors supplied with energy from batteries is well-known and will not be further described here.

With the motor running, the lines reciprocate, the drums rotate pulling all the vehicles forward. When any vehicle reaches the protuberance upon the line the drum is inactivated and that vehicle stops. When all the vehicles reach the limit of their travel the motor is stopped by the operator. As soon as the vehicles are stopped the water is added to the line causing the line to return to the lower position and start sprinkling again.

When one field is completely watered and it is desired to move the system, the system can be reversed to water the same field again starting from the opposite end. In such case the stakes to which cables 56 are attached are moved to the opposite side of the line of vehicles. The bolts are removed from between tabs 80 and plates 78 so that the wheels can caster around and then reattached if desired so that they are held in the proper position for their new line of travel. The cable 56 is threaded by pulley (not shown) to reverse its movement and under the irrigation pipe. It is necessary for the cable to go under the irrigation pipe so that it does not interfere with the raising and lowering of the pipe. A guide (not shown) on the opposite side of the vehicle prevents the cable tending to cause the vehicle to move in a direction other than the direction of line of pull of the cable.

If it is desired to move the line of vehicles to an adjacent field it is possible to do so by removing all the bolts between the tabs 80 and plates 78 leaving the wheels free to caster. Therefore a tractor may be attached to one end of the irrigation pipe and the whole system moved in a direction longitudinally of the irrigation pipe.

Another method of movement is that the cable from one or more of the drums could be staked in any direction of desired movement (either normal to the irrigation pipe, parallel to the axis or at some other angle thereto). Operation of the motor 100 would cause movement in the direction to which the cables were extended.

*Battery recharger*

Although I have found the storage batteries will operate for considerable length of time without recharging and it is not too difficult to bring recharged batteries to the master vehicle, I also find it desirable in certain installations to provide a battery recharger in connection with the master vehicle.

Short piece of pipe 116 is attached permanently to the clamp of the master vehicle. Each side of this pipe has standard terminal connections for attaching additional elements of the irrigation pipe 24. Pitot 118 is in the pipe. At the other end of the short section is reverse Pitot 120. The Pitot and reverse Pitot are connected by tube 122. Therefore it may be seen that if any amount of water is flowing through the pipe that a certain amount will be diverted through tube 122. Valve 124 is set in the tube 122 to regulate the flow of water to any desired amount. Water turbine 126 is inserted within a portion of the tube 122. The shaft of the turbine extends through seal 128 so that pulley 130 may be attached thereto. I have found that water turbines as are commonly used as submergible water pumps are good for this service. Submergible water pumps as used to pump domestic water from deep wells are readily available in the areas wherein this type irrigation equipment is found.

Generator 132 is attached adjacent to the turbine 126. I have found that an ordinary automotive generator is adaptable for this. The generator is mechanically attached by a belt 134 to the pulley 130. It is electrically connected through suitable voltage regulators to the batteries 98. The amount of current generated is adjusted by the valve 124. If the water flows in the reverse direction the water turbine will turn in reverse direction without particular difficulty. The generator maintains the same direction of rotation by crossing the belt 134. Otherwise by reversal of certain wires the generator can be made to generate current of the same polarity regardless of the direction of rotation.

The generator may be directly driven from the shaft of the water turbine without the use of a belt. I have found that most automotive generators are sufficiently weatherproof that it is not essential to protect them from the elements. Of course if desired they may be protected by providing a cover as may be motor 100 and batteries 98.

It will be apparent that the embodiments shown are only exemplary and that various modifications can be made in construction, materials, and arrangement within the scope of the invention as defined in the appended claims.

I claim as my invention:

1. In a vehicle having a frame, ground engaging wheels mounted to the frame, clamp means for attaching an irrigation pipe to the frame, said clamp means mounted for raising and lowering the irrigation pipe on said frame; the improvement comprising: a mast extending vertically upward from the clamp means, guides interconnecting said frame and clamp means so that the mast is maintained in a vertical position regardless of the elevation of the clamp means, and support elements extending either side of the mast for supporting irrigation pipe regardless of the amount of elevation of the pipe from the ground.

2. The invention as defined in claim 1 with the addition of an axle mounted on the frame, a drum on the axle, means for rotating the drum, and a flexible member connecting the drum and clamp means so that rotation of the drum raises the clamp means.

3. The invention as defined in claim 1 with the addition of an axle mounted for rotation on the frame, a spring interconnecting the axle and frame exerting a torque on the axle and means for interconnecting the axle and clamp means so that rotation of the axle raises the clamp means.

4. In an agricultural irrigation system having
   (a) an elongated irrigation pipe adapted to carry water under pressure,
   (b) a plurality of vehicles attached to the pipe,
   (c) means on the pipe for sprinkling water from the pipe onto the land to be irrigated,
the combination comprising:
   (d) at least one cable extending along the pipe,
   (e) means on each vehicle for moving the vehicle
   (f) responsive to reciprocation of the cable;
in combination therewith, an improved means for reciprocation the cable comprising;
   (g) two sprockets mounted on one of said vehicles,
   (h) means mounted on said vehicle for rotating one sprocket,
   (j) a chain trained around said sprockets, and
   (k) a connection from the chain to the cable so that rotation of said sprocket reciprocates said cable.

5. In an agricultural system having
   (a) an elongated irrigation pipe adapted to carry water under pressure,
   (b) a plurality of vehicles attached to the pipe, and
   (c) means on the pipe for sprinkling water from the pipe on the land to be irrigated,
the improvement comprising:
   (d) at least one cable extending along the pipe,
   (e) means attached to one vehicle for reciprocating the cable, and
   (f) means on each vehicle for moving the vehicle and thus the pipe transverse to the pipe
   (g) responsive to reciprocating of the cable
   (h) a clamp at each vehicle clamp onto the pipe,
   (j) an axle mounted on each vehicle,
   (k) a drum on each of said axles,
   (m) means on each vehicle for rotating each of said drums, and
   (n) a flexible member connecting the drum on each of the vehicles and the clamp at said vehicle so that rotation of the drum raises the clamp.

References Cited by the Examiner

UNITED STATES PATENTS

| | | | |
|---|---|---|---|
| 466,187 | 12/1891 | Sauer | 239—199 |
| 2,057,217 | 10/1936 | Soper | 239—189 |
| 2,127,858 | 8/1938 | Coleman | 242—95 |
| 2,166,479 | 7/1939 | Ruddock | 242—107 |
| 2,308,771 | 1/1943 | Mooney | 242—107 |
| 2,413,341 | 12/1946 | Swift | 144—208.4 |
| 2,493,528 | 1/1950 | Crowder | 238—189 |
| 2,642,235 | 6/1953 | Smith | 242—95 |
| 2,642,311 | 6/1953 | Beyer | 239—1 |
| 2,800,364 | 7/1957 | Dick et al. | 239—178 |
| 2,893,643 | 7/1959 | Gordon | 137—344 |
| 2,910,993 | 11/1959 | Phillips | 239—186 |
| 2,912,996 | 11/1959 | Moulton | 137—344 |
| 2,918,800 | 12/1959 | Ford | 239—170 |
| 2,931,579 | 4/1960 | Ruddell | 239—179 |
| 2,958,470 | 11/1960 | Giwosky | 239—189 |
| 2,993,648 | 7/1961 | Blackwell | 239—1 |
| 3,009,646 | 11/1961 | Purtell | 239—189 |

FOREIGN PATENTS 414,551  6/1925  Germany.

M. HENSON WOOD, Jr., *Primary Examiner.*

M. CAREY NELSON, WILLIAM F. O'DEA, LOUIS J. DEMBO, EVERETT W. KIRBY, *Examiners.*